(12) United States Patent
Luu

(10) Patent No.: US 6,587,199 B1
(45) Date of Patent: Jul. 1, 2003

(54) EMBEDDED DATA ACQUISITION AND CONTROL SYSTEM FOR NON-INVASIVE GLUCOSE PREDICTION INSTRUMENT

(75) Inventor: Ui Luu, Phoenix, AZ (US)

(73) Assignee: Sensys Medical, Inc., Chandler, AZ (US)

( * ) Notice: Subject to any disclaimer, the term of this patent is extended or adjusted under 35 U.S.C. 154(b) by 0 days.

(21) Appl. No.: 09/513,551

(22) Filed: Feb. 25, 2000

(51) Int. Cl.$^7$ ................................................. G01J 3/12
(52) U.S. Cl. ...................................... 356/332; 356/331
(58) Field of Search ................................ 356/326, 328, 356/332, 331; 702/30

(56) References Cited

U.S. PATENT DOCUMENTS

| | | | |
|---|---|---|---|
| 4,643,572 A | | 2/1987 | Sonobe et al. ............... 356/334 |
| 4,804,266 A | * | 2/1989 | Barshad ........................ 356/328 |
| 5,038,088 A | * | 8/1991 | Arends et al. ................. 310/58 |
| 5,096,295 A | * | 3/1992 | Krupa et al. ................. 356/334 |
| 6,115,673 A | * | 9/2000 | Malin et al. ................... 702/23 |

FOREIGN PATENT DOCUMENTS

| | | | |
|---|---|---|---|
| EP | 0961107 A3 | 12/1999 | ....................... 3/28 |
| EP | 0961107 A2 | 12/1999 | ....................... 3/28 |

* cited by examiner

*Primary Examiner*—Zandra V. Smith
(74) *Attorney, Agent, or Firm*—Glenn Patent Groupo; Michael A. Glenn; Kirk D. Wong

(57) ABSTRACT

An embedded data acquisition and control system for a precision instruments, such as a non-invasive glucose prediction instrument is disclosed. One feature of the invention provides synchronization of stepper motor position and analog-to-digital converters. An embedded controller is provided that controls the stepper motor driver directly to minimize the wavelength shift error due to the asynchronous condition. The controller synchronizes the event of reading the A/D converters with each stepper motor position. Because the stepper motor controls the wavelength of the monochromator optical output, the net result is that each A/D conversion recorded by the embedded controller is precisely tracked to a specific wavelength. Another feature of the invention provides closed loop motor position control for enhanced system performance. In the closed loop system, a position encoder is coupled to the stepper motor shaft. The encoded position signal is processed by a digital encoder at the bipolar stepper motor drive, resulting in an actual position feedback to the embedded controller. Because the embedded controller has the position feedback, it can initiate the next step command as soon as the position feedback reaches its target. The step rate is increased by reducing the time delay that was set by a conservative value as indicated in the open loop control mode. One advantage of this method is to achieve highest speed in all load conditions without missing steps. A further feature of the invention provides optical Isolation to minimize motor noise. Thus, optical isolation is provided at a bipolar stepper motor drive and embedded controller interface. To maximize system sensitivity, optical isolation is implemented between the embedded controller and the stepper motor drive.

22 Claims, 8 Drawing Sheets

EMBEDDED DATA ACQUISITION AND CONTROL SYSTEM FOR NON-INVASIVE GLUCOSE PREDICTION INSTRUMENT

BACKGROUND OF THE INVENTION

1. Technical Field

The invention relates to precision instruments. More particularly, the invention relates to an embedded data acquisition and control system for a non-invasive glucose prediction instrument.

2. Description of the Prior Art

The following deficiencies are noted with regard to state of the art data acquisition and control systems for such precision applications as the non-invasive measurement of blood glucose, where data are collected and digitized and where a complex device, such as a monochromator, is used as a light source.

Stepper Motor Control is Asynchronous with A/D Capture

FIG. 1 is a block schematic diagram that illustrates a prior art stepper motor control for a monochromator and an analog-to-digital conversion process. In the existing data acquisition system, a PC host 10 controls the stepper motor 12 position by sending a command via an RS232 serial link 11 to a bipolar stepper motor controller 13. The stepper motor controller then initiates signals to drive the stepper motor.

While the stepper motor is moving from position A to position B, the PC asynchronously reads the optical signals through the analog to digital converter 14.

One of the key elements of data acquisition for predicting blood glucose is to analyze the optical signal intensity associated with its wavelength over the scanned spectrum. Because the existing system controls the stepper motor and performs A/D conversions asynchronously, it introduces errors in terms of wavelength shifts of optical signals.

Open Loop Motor Position Control

In an open loop control system, the motor position feedback is not monitored. A common design trade-off is to limit the stepping rate to ensure the motor can drive the mechanical load without missing a step. Because the speed-torque curve varies with individual motor and load conditions change with each application, generally, a conservative step rate is implemented. This limits instrument efficiency.

Motor Noise

When the stepper motor is switched by a driver, it creates transients in terms of load current drawn and inductive voltage kickback. A common practice is to apply transient suppression diodes at the motor coils to reduce the voltage spike. However, the load current change is conductivity coupled through the system. As a result, the coupled noise is measured in the order of millivolts.

SUMMARY OF THE INVENTION

The invention provides an embedded data acquisition and control system for a precision instrument, such as a non-invasive glucose prediction instrument, which incorporates a complex device, e.g. a monochromator, as a light source.

One feature of the invention provides synchronization of monochromator stepper motor position and analog-to-digital converters. To minimize the wavelength shift error due to the asynchronous condition as described above, an embedded controller is provided that controls the stepper motor driver directly. The controller synchronizes the event of reading the A/D converters with each stepper motor position. Because the stepper motor controls the wavelength of the monochromator optical output, the net result is that each A/D conversion recorded by the embedded controller is precisely tracked to a specific wavelength.

Another feature of the invention provides closed loop motor position control for enhanced system performance. In the closed loop system, a position encoder is coupled to the stepper motor shaft. The encoded position signal is processed by a digital encoder at the bipolar stepper motor drive, resulting in an actual position feedback to the embedded controller. Because the embedded controller has the position feedback, it can initiate the next step command as soon as the position feedback reaches its target. The step rate is increased by reducing the time delay that was set by a conservative value as indicated in the open loop control mode. One advantage of this method is to achieve highest speed in all load conditions without missing steps.

A further feature of the invention provides optical Isolation to minimize motor noise. Thus, optical isolation is provided at a bipolar stepper motor drive and embedded controller interface. To maximize system sensitivity, optical isolation is implemented between the embedded controller and the stepper motor drive.

DETAILED DESCRIPTION OF THE INVENTION

System Overview

The embedded data acquisition and control system herein disclosed in connection with the presently preferred embodiment of the invention consists of three components: an embedded microcontroller, a 20-bit analog-to-digital converter, and a stepper motor driver and position encoder.

Figure 1:
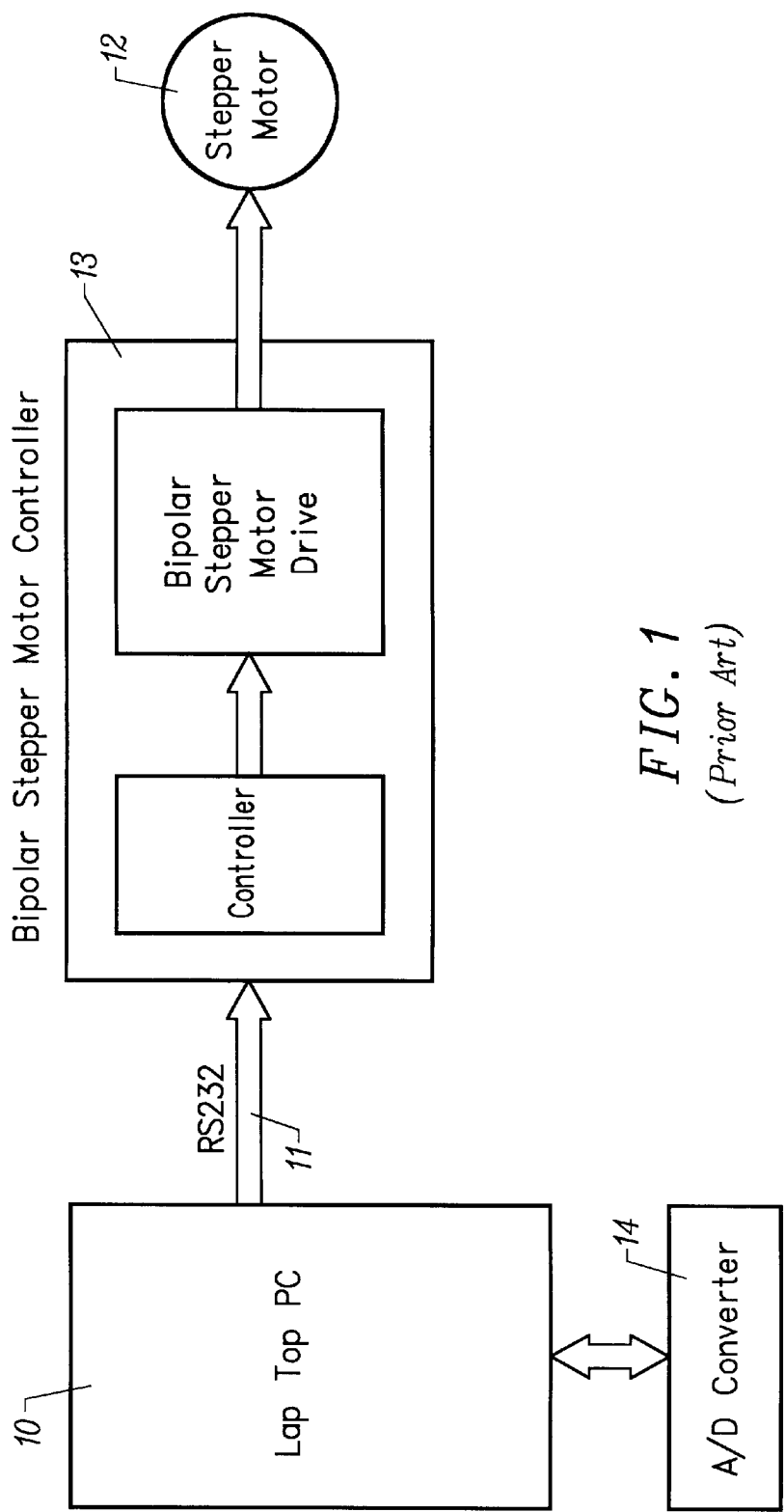
FIG. 1 is a block schematic diagram that illustrates a prior art stepper motor control and analog-to-digital conversion process.
Figure 2:
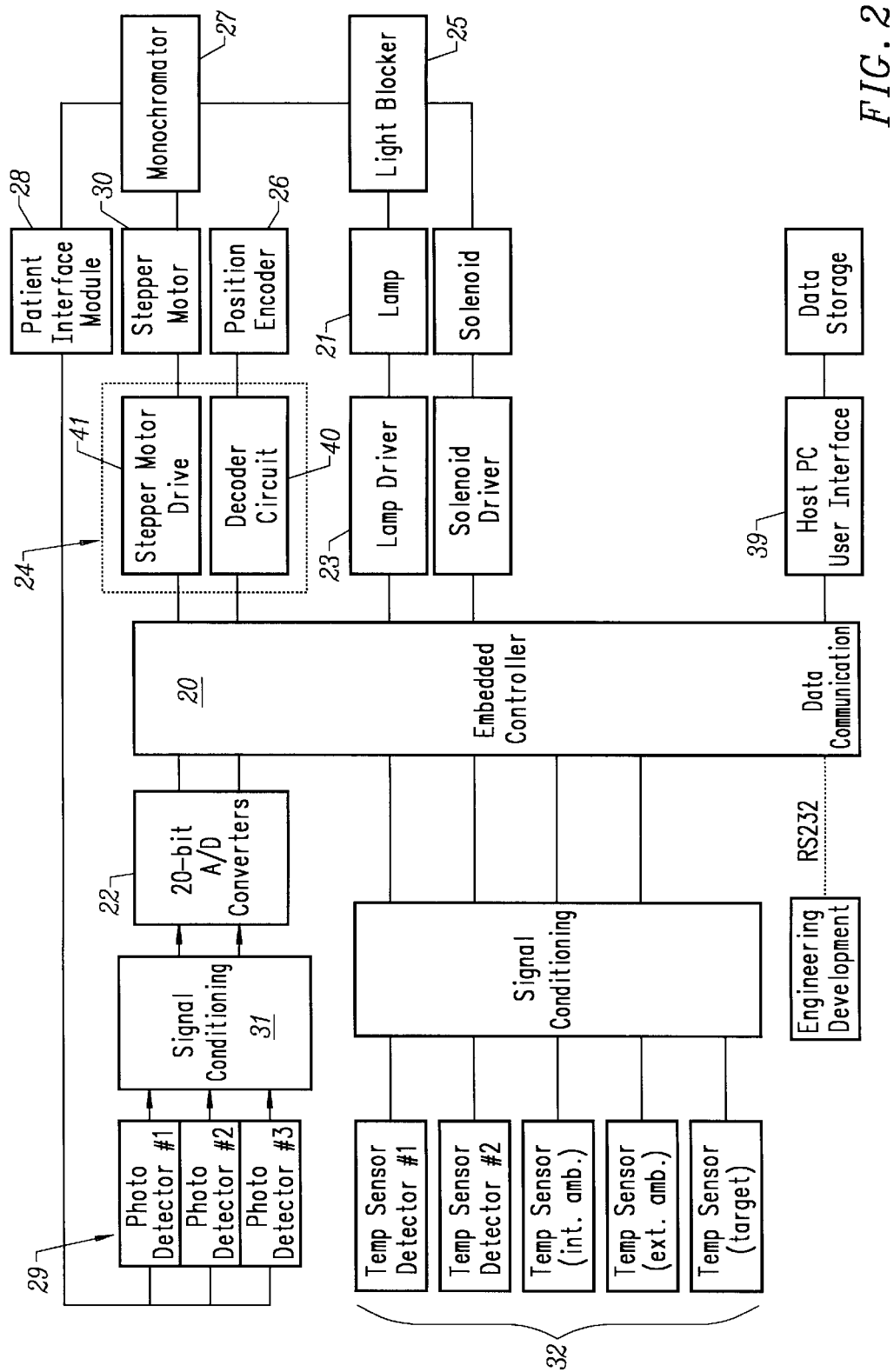
FIG. 2 is a block schematic diagram that illustrates an embedded data acquisition and control system, including an overall system interface according to the invention.

FIG. 2 is a block schematic diagram which illustrates an overall system interface of the embedded data acquisition and control system. The following discussion is provided in connection with the presently preferred embodiment of the invention, which is an instrument for effecting a non invasive determination of blood glucose levels. It will be appreciated by those skilled in the art that the invention is readily applicable to other instruments and is not limited to the embodiment herein described.

The presently preferred embodiment of the invention operates in connection with a monochromator, which serves as a light source that illuminates a tissue to be sampled in making a determination of blood glucose levels. A monochromator is an optical instrument that is designed to separate polychromatic white light (i.e. light consisting of more than one color or wavelength) into monochromatic light (i.e. light of a single color). State of the art monochromators typically use a Czerny-Turner optical system. Light enters an entrance slit and is collected by the collimating mirror. Collimated light strikes a grating and is dispersed into individual wavelengths (i.e. colors). Each wavelength leaves the grating at a different angle and is re-imaged at the exit slit by a focusing mirror. Because each wavelength images at a different horizontal position, only the wavelength at the slit opening is allowed to exit the monochromator. Varying the width of the entrance and exit slits allows more (or fewer) wavelengths of light to exit the system.

Rotating the diffraction grating scans wavelengths across the exit slit opening. The monochromatic light produced by a monochromator can be used to illuminate a sample, or it can be scanned across a detector and measured for intensity at individual wavelengths. Conventional monochromators use an oscillating grating to perform such spectral separation. The grating is typically oscillated by a drive mechanism.

A light source 21 is activated by a lamp driver 23. An optical signal travels through a light blocker 25, monochromator 27, and patient interface module 28, and feeds back to the digital system via one or more photo detectors 29. The embedded controller 20 selects the output wavelength of light spectrum by controlling a stepper motor 30 at the monochromator. The controlled optical signal reaches the target through the patient interface module, and is then received at the photo detectors. The electrical signal is conditioned by a signal conditioning module 31 and read by 20-bit analog-to-digital converters 22. The optical spectrum is then analyzed and processed by an algorithm to provide glucose level prediction. Various algorithms are known. Selection of a particular algorithm is a matter of choice for those skilled in the art and a discussion thereof is beyond the scope of the disclosure herein.

The stepper motor control module 24 consists of stepper motor drive 41 and decoder circuit 40. The stepper motor drive provides power to actuate the stepper motor 30. The position encoder 26 is coupled to stepper motor shaft to provide position feedback signal. The decoder circuit translates the encoded signal to position information in terms of number of steps.

Temperature sensors 32 are incorporated to monitor detectors temperature, instrument internal temperature, external ambient and target temperature.

Host PC User Interface is a graphical user interface implemented at a laptop PC or workstation to provide session control, data capture and storage.

Embedded Microcontroller

Figure 3:
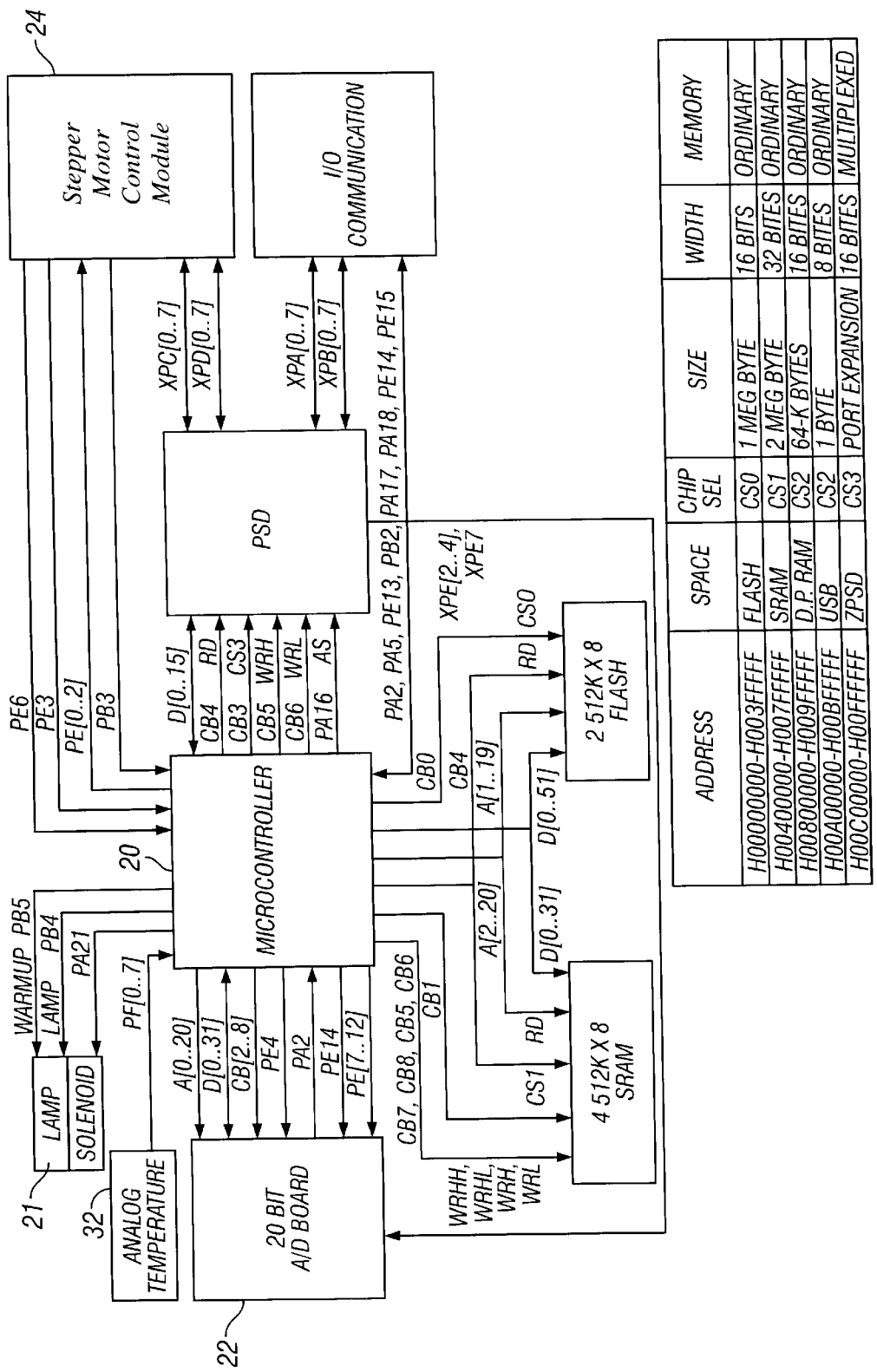
FIG. 3 is a block schematic diagram that illustrates an I/O interface and memory mapping according to the invention.

FIG. 3 is a block schematic diagram which illustrates the I/O interface and memory mapping that achieve the above functional requirements.

The microcontroller 20 provides control sequence of the data acquisition system. To optimize I/O through-put, a processor with RISC (Reduced Instruction Set) architecture is implemented.

The microcontroller send digital outputs to lamp driver circuit to control lamp 21. A WARMUP signal is provided to limit cold in-rush current. Solenoid control to activate light shutter mechanism.

A companion integrated circuit (PSD) is designed to provide control signals to Stepper Motor Control Module 24 which actuates the monochromator.

Address, Data and Control buses are accessible to an external 20-bit A/D board 22. The microcontroller captures and stores results from the 20-bit A/D board.

Temperature sensors 32 are incorporated to monitor detectors temperature, instrument internal temperature, external ambient and target temperatures. The analog signals are translated to digital values by analog-to-digital converters. Results of conversions are captured and stored.

Key responsibilities of the microcontroller include:

Controlling the illumination system;

Controlling the monochromator;

Capture and store optical data from the patient Interface and the photo detectors; and Monitor temperature sensors 32 on instruments and the patient interface.

20-bit Analog-to-Digital Converter

Figure 4:
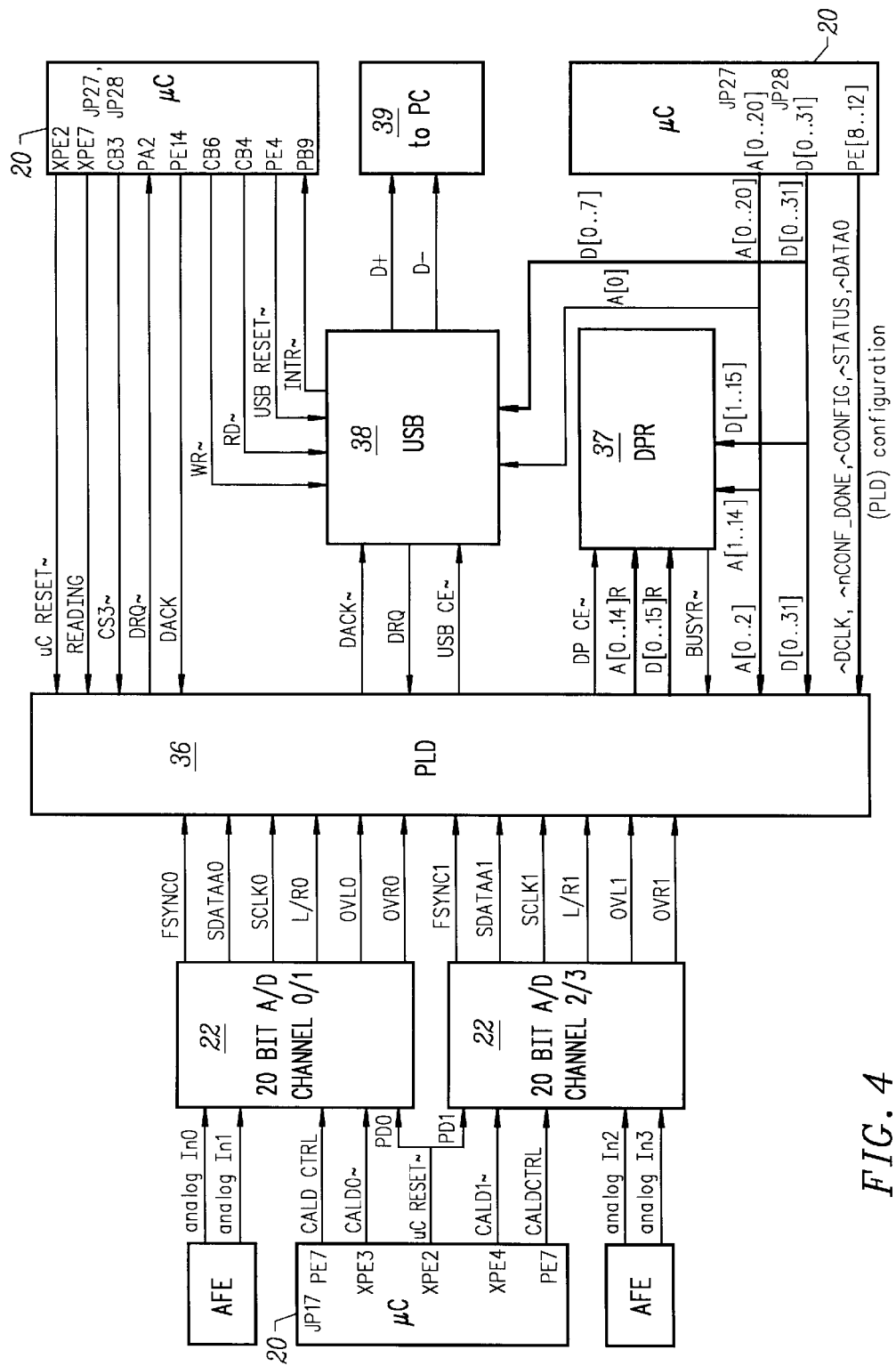
FIG. 4 is a block schematic diagram that illustrates an analog-to-digital converter according to the invention.

FIG. 4 is a block schematic diagram that illustrates an analog-to-digital converter 22 according to the invention. Two 20-bit analog-to-digital converters (A/D) are controlled by a programmable logic device (PLD) 36. The PLD provides timing and control signals to sample and capture four channels of 20-bit A/D (0/1, 2/3). The results of data captured are stored in a dual port RAM (DPR) 37 for data storage. A universal serial bus (USB) 38 device is provided for transferring captured data to a PC host 39 for further data processing and analysis.

The microcontroller 20 provides the following control signals to the Analog-to-Digital Converter board:

Reset signal:uC RESET~

Calibration signals: CALD_CTRL, CALDO~, CALD1~

The microcontroller also provides address, data and control bus to the USB controller 38 and Dual Port RAM (DPR) 37.

Stepper Motor Driver and Position Encoder

Figure 5:
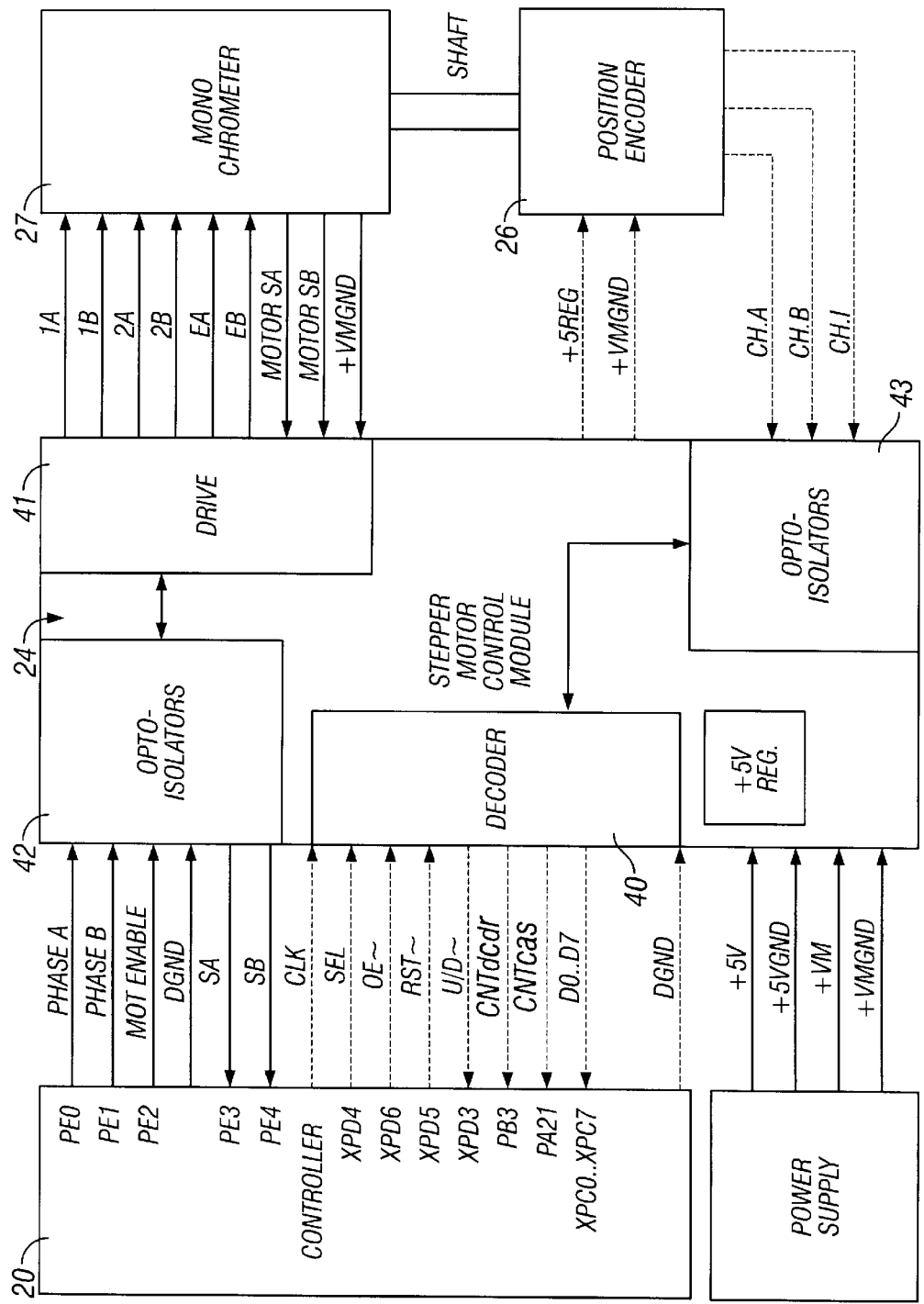
FIG. 5 is a block schematic diagram that illustrates a system interface for a stepper motor driver module according to the invention.

FIG. 5 is a block schematic diagram that illustrates the system interface for the stepper motor control module 24. Key responsibilities of this module include:

Providing optical isolation 42 between the microcontroller and the stepper motor;

Providing a drive 41 for effecting two phase control of the bipolar stepper motor component of the monochromator;

Monitoring optical stops for the range of motor movements; and

Providing a decoder 40 for decoding stepper information received from the optical position encoder via one or more optoisolators 43.

The Monochromator 27 employs a bipolar stepper motor to rotate the optical component. The microcontroller 20 provides two-phase control and motor enable lines. Optoisolators 42 provide isolation of digital components and motor driver 41. Isolation is required to minimize noise feedback due to inductive transients caused by switching currents in stepper motor phases. The monochromator also provides two optical stop signals (SA & SB), each indicates an end point of movement in each direction.

A position encodes 26 is coupled to the stepper motor shaft to provide position feedback information. State of the art position encoder typically contains a lensed LED source, an integrated circuit with detectors and output circuitry, and a codewheel which rotates between the emitter and detector IC. The outputs of the position encoder are two square waves in quadrature.

The position decoder 40 is an integrated circuit that performs the quadrature decoder, counter, and bus interface function. The quadrature decoder samples CHA and CHB signals from position encoder 26. Based on the past binary state of the two signals and the present state, it outputs a count signal and a direction signal to the internal position counter. The microcontroller 20 obtains the position information by reading the position counter at the decoder.

Salient Features

Synchronization of Stepper Motor Position and Analog-to-Digital Converters

Figure 6:
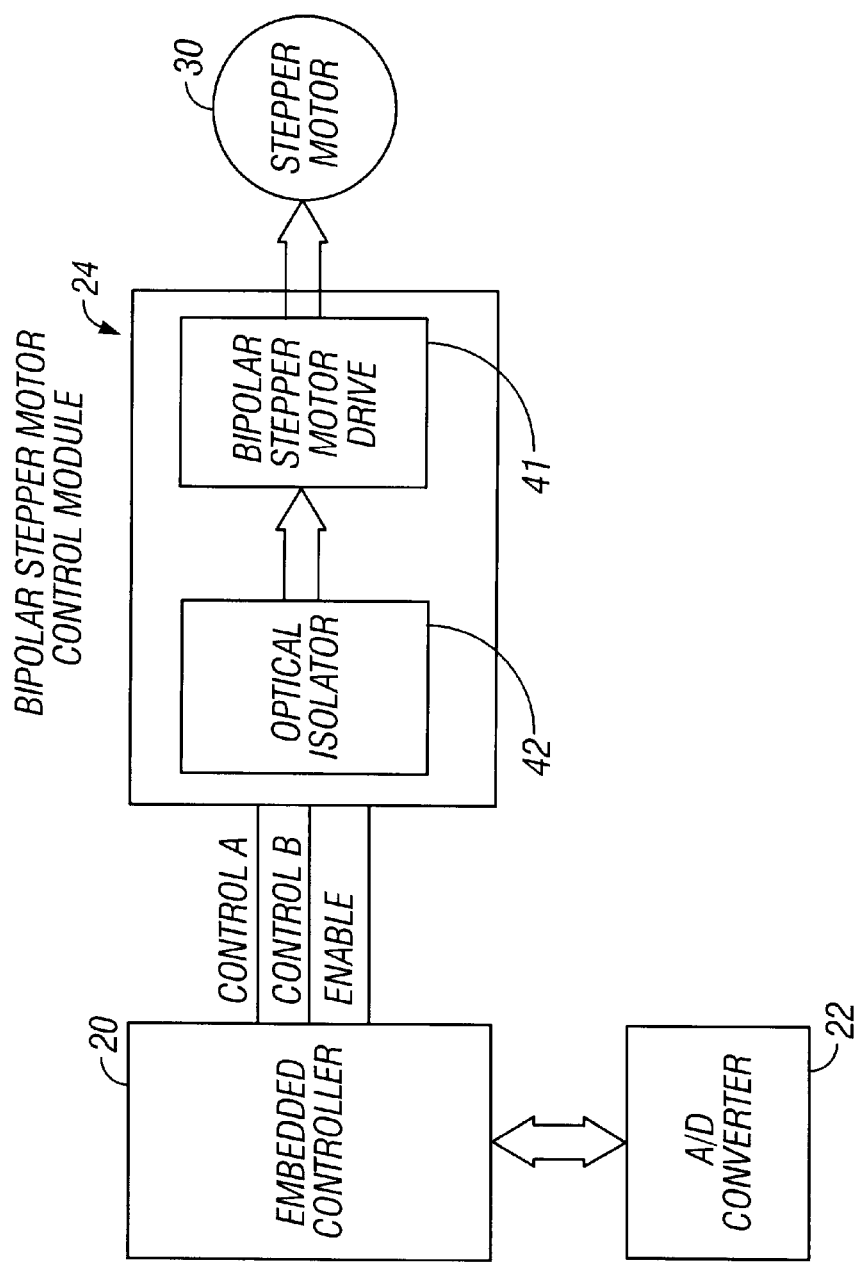
FIG. 6 is a block schematic diagram that illustrates a mechanism for synchronization of the stepper motor control and analog-to-digital conversion according to the invention.

FIG. 6 is a block diagram that illustrates a mechanism for synchronization of stepper motor control and analog-to-digital conversion. To minimize the wavelength shift error due to the asynchronous condition as described above, an embedded controller 20 is provided that controls the stepper motor control module 24 directly. The controller synchronizes the event of reading the A/D converters 22 with each stepper motor position. Because the stepper motor controls the wavelength of the monochromator optical output, the net result is that each A/D conversion recorded by the embedded controller is precisely tracked to a specific wavelength.

One of the key elements of spectrum analysis for predicting glucose level is the intensity associated with a particular wavelength. Any errors in wavelength shift will result in algorithmic error in predicting glucose levels. By synchronizing the A/D reading and stepper motor control, spectral data collected is more precise and repeatable. The end result is improvement in accuracy and repeatability of prediction.

Closed Loop Motor Position Control for Enhanced System Performance

Figure 7:
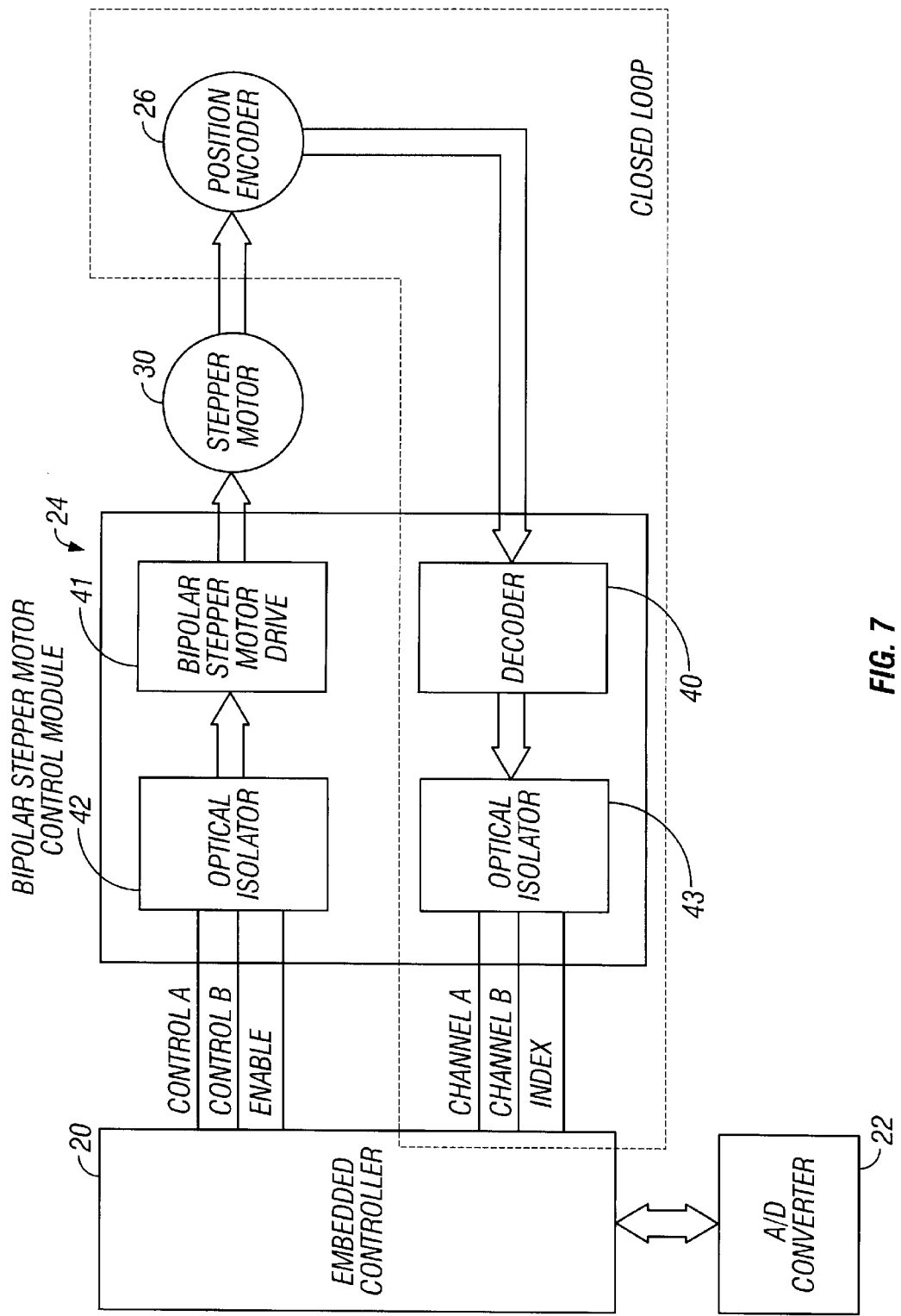
FIG. 7 is a block schematic diagram that illustrates optical isolation at a bipolar stepper motor drive and an embedded controller interface according to the invention.

FIG. 7 is a block schematic diagram that illustrates closed loop motor position control according to the invention. In a closed loop system as illustrated in FIG. 7, a position encoder 26 is coupled to the stepper motor 30 shaft (not shown). The encoded position signal is processed by a digital encoder at the bipolar stepper motor drive, resulting in an actual position feedback to the embedded controller.

Because the embedded controller has the position feedback, it can initiate the next step command as soon as the position feedback reaches its target. The step rate is increased by reducing the time delay that was set by a conservative value as. indicated in the open loop control mode. One advantage of this method is to achieve highest speed in all load conditions without missing steps.

Optical Isolation for Minimizing Motor Noise

FIG. 7 also illustrates optical isolation at a bipolar stepper motor drive and the embedded controller interface according to the invention. To maximize system sensitivity, optical isolation 42, 43 is implemented between the embedded controller and the stepper motor drive. The achieved system performance provides the following specifications:

| Resolution: | 20-bit |
|---|---|
| Measured RMS Noise: | 20 uV |
| Dynamic Range: | 108 dB. |

In a bipolar stepper motor drive 41 circuit with inductive load such as stepper motor 30, any switching of current will induce inductive transients in terms of voltage spikes. For a high precision system, any spike in excess of hundreds of microvolts results in interference to spectrum analysis. To minimize the magnitude of the inductive transients, noise suppression diodes are implemented at the motor drive circuit across the motor coils. To further reduce the residual noise, optical isolators are used to decouple the high power circuit and the embedded controller 20. State of the art optical isolator typically contains GaAs light emitting diode and an NPN silicon phototransistor. It has a minimum isolation resistance of $10*e11$ Ohm. The result is electrical isolation of power circuit and noise sensitive circuits of embedded controller 20 and A/D Converter 22.

Figure 8:
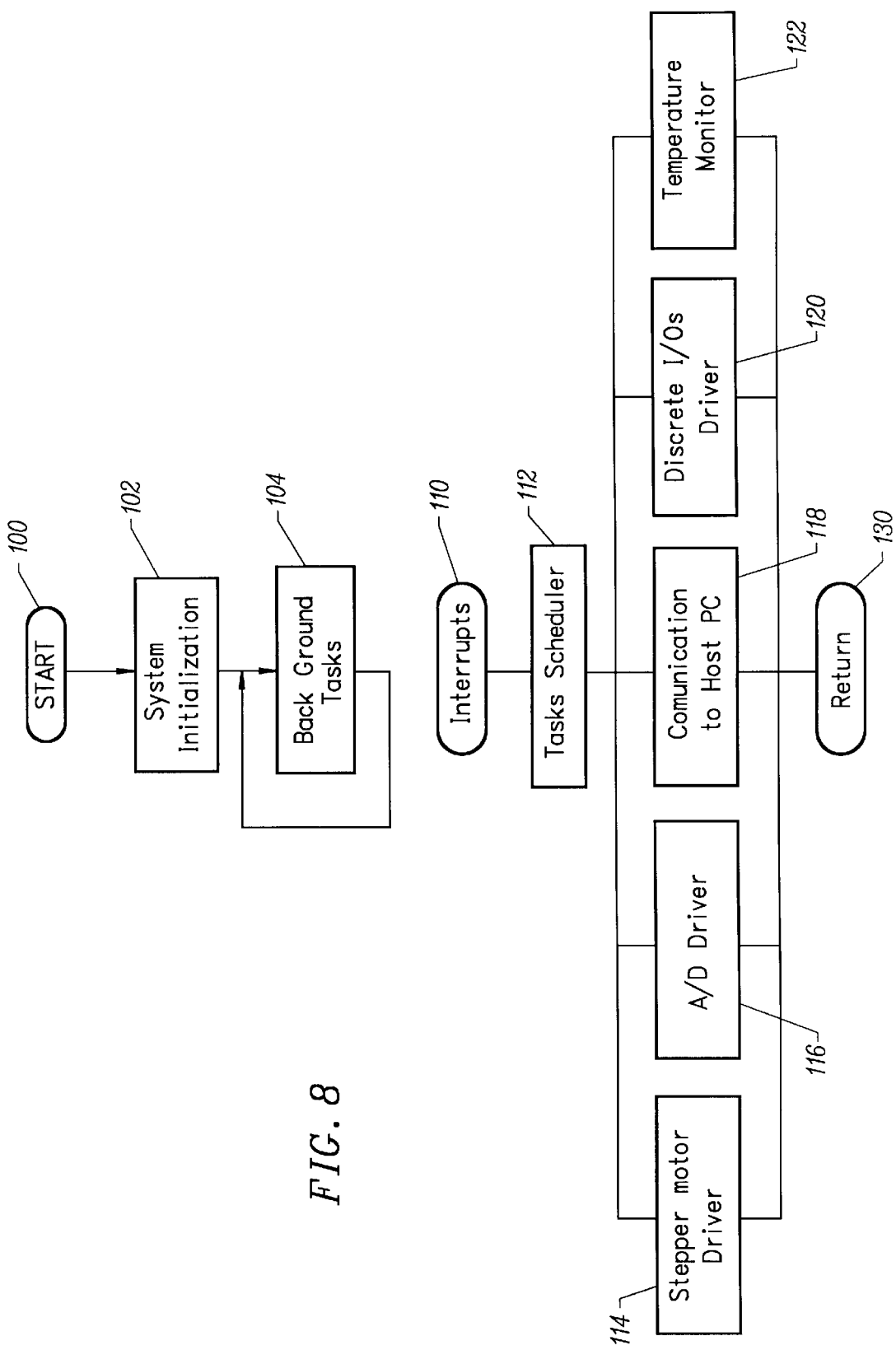
FIG. 8 is a flow diagram that illustrates system control and interrupt structure according to the invention.

FIG. 8 is a flow diagram that illustrates system control and interrupt structure according to the invention. At the start of operation (100), the system is initialized (102). Initializations include setting up all control registers, communication channels, power up light source and moving stepper motor to initial position. The system is interrupt (110) driven with tasks scheduler (112). Communication to Host PC (118) provides user's input to control a scan session. Commands from user inputs are scheduled to control the discrete I/O driver (120), stepper motor drive (114), synchronizing the motor position with A/D reading (116) and Temperature Monitor (112). After the interrupts are handled, the system returns to Back Ground Tasks (104).

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A data acquisition and control system for a precision instrument, comprising:

a monochromator, said monochromator including a stepper motor for controlling the wavelength of said monochromator's optical output;

an analog-to-digital converter;

an embedded controller for synchronizing said stepper motor position and said analog-to-digital converter; and optical isolation for minimizing stepper motor noise, wherein said optical isolation is provided at a bipolar stepper motor drive and controller interface.

2. The data acquisition and control system of claim 1, wherein said controller synchronizes reading of said A/D converter with each stepper motor position; and wherein each A/D conversion recorded by said controller is precisely tracked to a specific wavelength.

3. The data acquisition and control system of claim 1, further comprising:

a closed loop motor position controller.

4. The data acquisition and control system of claim 3, said closed loop motor position controller comprising:

a digital position encoder is coupled to a stepper motor shaft; and a bipolar stepper motor drive.

5. The data acquisition and control system of claim 4, wherein an encoded position signal is processed by said digital position encoder at said bipolar stepper motor drive to provide actual position feedback to said controller.

6. The data acquisition and control system of claim 5, wherein said controller initiates a next step command as soon as said position feedback reaches its target.

7. A data acquisition and control system for a precision instrument, comprising:

a monochromator, said monochromator including a stepper motor for controlling the wavelength of said monochromator's optical output;

an analog-to-digital converter;

an embedded closed loop motor position controller; and optical isolation for minimizing stepper motor noise, wherein said optical isolation is provided at a bipolar stepper motor drive and controller interface.

8. The data acquisition and control system of claim 7, said closed loop motor position controller comprising:
- a digital position encoder is coupled to a stepper motor shaft; and
- a bipolar stepper motor drive.

9. The data acquisition and control system of claim 8, wherein an encoded position signal is processed by said digital position encoder at said bipolar stepper motor drive to provide actual position feedback to said controller.

10. The data acquisition and control system of claim 9, wherein said controller initiates a next step command as soon as said position feedback reaches its target.

11. A data acquisition and control system for a precision instrument, comprising:
- monochromator, said monochromator including a stepper motor for controlling the wavelength of said monochromator's optical output;
- an analog-to-digital converter; and
- optical isolation for minimizing stepper motor noise, wherein said optical isolation is provided at a bipolar stepper motor drive and embedded controller interface.

12. A data acquisition and control process for a precision instrument, comprising:
- providing a monochromator, said monochromator including a stepper motor for controlling the wavelength of said monochromator's optical output;
- providing an analog-to-digital converter;
- synchronizing said stepper motor position and said analog-to-digital converters; and
- providing optical isolation for minimizing stepper motor noise, wherein said optical isolation is provided at a bipolar stepper motor drive and embedded controller interface.

13. The data acquisition and control process of claim 12, wherein said controller synchronizes reading of said A/D converter with each stepper motor position; and wherein each A/D conversion recorded by said controller is precisely tracked to a specific wavelength.

14. The data acquisition and control process of claim 12, further comprising the step of:
- providing a closed loop motor position controller.

15. The data acquisition and control process of claim 14, said closed loop motor position controller comprising the steps of:
- providing a digital position encoder is coupled to a stepper motor shaft; and
- providing a bipolar stepper motor drive.

16. The data acquisition and control process of claim 15, wherein an encoded position signal is processed by said digital position encoder at said bipolar stepper motor drive to provide actual position feedback to said controller.

17. The data acquisition and control process of claim 16, wherein said controller initiates a next step command as soon as said position feedback reaches its target.

18. A data acquisition and control process for a precision instrument, comprising the steps of:
- providing a monochromator, said monochromator including a stepper motor for controlling the wavelength of said monochromator's optical output;
- providing an analog-to-digital converter;
- providing an embedded closed loop motor position controller; and
- providing optical Isolation for minimizing stepper motor noise, wherein said optical isolation is provided at a bipolar stepper motor drive and controller interface.

19. The data acquisition and control process of claim 18, said closed loop motor position controller comprising:
- a digital position encoder is coupled to a stepper motor shaft; and
- a bipolar stepper motor drive.

20. The data acquisition and control process of claim 19, wherein an encoded position signal is processed by said digital position encoder at said bipolar stepper motor drive to provide actual position feedback to said controller.

21. The data acquisition and control process of claim 20, wherein said controller initiates a next step command as soon as said position feedback reaches its target.

22. A data acquisition and control process for a precision instrument, comprising the steps of:
- providing a monochromator, said monochromator including a stepper motor for controlling the wavelength of said monochromator's optical output;
- providing an analog-to-digital converter; and
- providing optical isolation for minimizing stepper motor noise, wherein said optical isolation is provided at a bipolar stepper motor drive and embedded controller interface.

* * * * *